Jan. 9, 1968  E. B. COX  3,363,156
CAPACITOR WITH A POLYOLEFIN DIELECTRIC
Filed Oct. 19, 1966

INVENTOR:
EUGENE B. COX,
BY James J. Lichiello
HIS ATTORNEY.

# United States Patent Office 3,363,156
Patented Jan. 9, 1968

3,363,156
CAPACITOR WITH A POLYOLEFIN
DIELECTRIC
Eugene B. Cox, South Glens Falls, N.Y., assignor to General Electric Company, a corporation of New York
Filed Oct. 19, 1966, Ser. No. 587,835
17 Claims. (Cl. 317—259)

ABSTRACT OF THE DISCLOSURE

Non-porous polyolefin materials are essentially completely impregnated with a chlorinated hydrocarbon dielectric liquid impregnant to provide an improved dielectric system particularly applicable for capacitors.

---

This application is a continuation-in-part of copending applications, Ser. Nos. 508,529 and 513,240, filed Nov. 18, 1965, both now abandoned, and Dec. 13, 1965 respectively, and both assigned to the same assignee as the present invention.

The present invention relates to improved impregnated synthetic resin dielectric systems having long life, high voltage stress characteristics, and more particularly to A-C electrical capacitors of the foregoing type utilizing an impregnated polyolefin resin dielectric system.

The advent of more complex and sophisticated electrical apparatus and the trend to higher operating efficiency of present apparatus has led to more stringent requirements for the capacitor elements of such apparatus. For example, there is an indicated need for higher power rated capacitors of greater efficiency, smaller size and cost. Capacitor elements, particularly A-C capacitors having significantly higher dielectric strength and corona start or extinction voltages, are most desirable in order to alleviate substantial problems in electrical apparatus design and operation and to improve operation of existing apparatus.

It is an object of this invention to provide an improved capacitor having substantially increased volumetric efficiency.

Another object of the present invention is to provide an electrical capacitor having a solid synthetic resin dielectric spacer of substantially reduced thickness but which is capable of withstanding high voltage alternating current stress.

A still further object of this invention is to provide an improved A-C electrical capacitor having a polyolefin film and a halogenated hydrocarbon impregnant as the major component of the capacitor's dielectric spacer.

It is yet another object of this invention to provide an improved high voltage A-C capacitor including a polypropylene film impregnated with trichlorodiphenyl.

I have discovered that certain prescribed combinations of materials and processing will provide an impregnated synthetic resin capacitor of unexpectedly favorable electrical characteristics. In one preferred form of this invention a synthetic polyolefin resin, for example a polypropylene, is impregnated with a halogenated aromatic material, for example trichlorodiphenyl, and utilized as the dielectric spacer member in a capacitor element. It has been further discovered that the mentioned materials combine and coact in such a manner to provide impregnation of the polyolefin, of a kind which, in combination with other characteristics of the materials, significantly improves the most important electrical criteria of capacitors, such as dielectric strength, corona start and extinction voltage, long life under voltage stress, and low power factor.

While this specification concludes with claims particularly pointing out and distinctly claiming the subject matter of the present invention, it is believed that the invention will be better understood from the following description taken in conjunction with the accompanying drawings in which:

Figure 1:
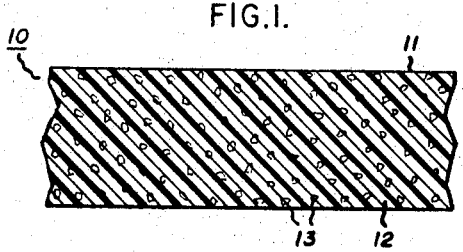
FIG. 1 is an enlarged cross sectional view of a portion of an essentially completely impregnated resinous dielectric spacer.

Referring now to FIG. 1, there is illustrated one preferred dielectric spacer embodiment 10 of this invention including a section of a solid polyolefin resin dielectric material 11 having numerous minute discontinuities 12 otherwise characterized as apertures, voids, and interstices, whose presence is a recognized characteristic of the resin. This material is described as non-porous in that there are few if any pores or passages interconnecting and passing through side surfaces which would permit the movement of an impregnant fluid of this invention through opposite ride surfaces. The polyolefin resin material is impregnated with a dielectric liquid impregnant which permeates the material itself as well as filling these discontinuities, and the composite constitutes a continuous, though heterogeneous, dielectric system. Surprisingly, the kind of impregnation obtained by the teachings of this invention in combination with specific materials leads to a kind of synergistic effect the result of which increases the dielectric strength of the combination. In one respect impregnation increases the electrical insulating qualities of the resin dielectric by incorporating in the resin an impregnant material having a higher dielectric strength than the air or gas in the described discontinuities. Examples of capacitors utilizing other impregnated dielectric systems than those herein are found in U.S. Patents 2,864,-982 Ruscetta and 2,307,488 Clark, each assigned to the same assignee as the present invention.

Unexpectedly good results have been obtained from the composite of FIG. 1 when utilized for example as a capacitor element, particularly for a high voltage A-C capacitor, where certain combinations of polyolefin materials and impregnants are utilized. While numerous combinations of materials other than the polyolefins and impregnants of my invention have been described heretofore, the prior-known combinations have been found to be unproductive of the desirable characteristics and results demanded by the sophisticated and complex electrical apparatus now being employed. Those materials which provide the best results in this invention are the synthetic resins taken from the class of resins known as the polyolefins, and specifically polypropylene, polyethylene, 4-methyl pentene-1, and polystyrene.

The generally favorable characteristics of the polyolefins are their electrical properties as ordinary dielectrics (other than capacitor elements), good temperature stability, and mechanical properties such as ease of working and forming, particularly in thin films. While these favorable characteristics are found in numerous uses, applicability to dielectric systems such as capacitors has been limited notably because of low dielectric strength, low corona start voltage, and relatively short life under high voltage stress. Dielectric strength is most important and is a measure of the ability of the material to withstand voltage stress, i.e., voltage differential across a dimensioned unit of thickness. Corona start voltage (CSV) and corona extinction voltage (CEV) are the voltages at which deleterious corona discharge may commence and be extinguished, respectively. At the same time, a number of problems associated with impregnation, degree of impregnation and compatibility with impregnants have been deterrents to any impregnant method of increasing the desirable electrical characteristics of polyolefin material.

I have discovered that the polyolefins, and particularly polypropylene, may be impregnated to an unexpectedly high degree with halogenated aromatic liquids, and when so impregnated these elements combine and coact to provide the improved dielectric spacer of this invention. A preferred material of this class of polyolefins is polypropylene resin, particularly an isotactic biaxially oriented polypropylene film, a more complete description of one example of which may be found in Applied Plastics, November 1961, pp. 35 through 64, and Modern Dielectric Materials, J. B. Bink, London Heywood and Co., 1960, pp. 140–142, incorporated by reference herewith.

The polyolefin material of the mentioned articles may be described as linear, regular head to tail polymers of unsaturated hydrocarbons of the formula $CH_2=CHR$, i.e., alpha olefins, where R is a saturated aliphatic, an alicyclic, or an aromatic radical copolymers of said unsaturated hydrocarbons with one another, and copolymers of the unsaturated hydrocarbons with at least one other monomer copolymerizable therewith. This polyolefin material may also be referred to as non-porous in that there are essentially no continuous passages therethrough which would pass the preferred liquid impregnants of this invention under presently known capacitor operating conditions.

A preferred impregnant, according to my invention, is a halogenated organic material, being generally a compound having from 1 to 5 halogen substituents such as chlorine, and from 1 to 3 aryl groups. More specifically, a preferred impregnant is trichlorodiphenyl and commercially available as pyranol[1] 1499. This material has a high corona start and corona extinction voltage.

The combination of Pyranol 1499 dielectric liquid with a non-porous polypropylene film as an impregnated dielectric system provides the best results according to this invention. It has been indicated that these materials have been considered incompatible or undesirable and hence to be avoided for dielectric system applications because polypropylene shows evidence of being readily dissolved by halogenated organic compounds such as Pyranol 1499 liquid, and also of not being wettable by the mentioned liquid impregnants. It has also been indicated that the dissolving of polypropylene in a non-polar liquid leads to plasticizing effects such as swelling and low tensile strength. I have found, however, that except at very high temperatures, above about 100° C., polypropylene is soluble in halogenated aromatic materials only to a limited extent, and also that the partial solubility surprisingly does not adversely affect capacitor characteristics. This partial solubility of polypropylene film in trichlorodiphenyl under controlled temperature conditions of less than about 100° C. actually proves to be an important characteristic of this preferred combination in the present invention. In particular, the partial solubility which tests indicate to occur after initial penetration of the film, aids the migration of impregnant into the film as well as into the interstices and voids thereof. This enhancement of impregnation is evidenced by an extremely high corona start voltage in the impregnated system, even in the absence of a wick or porous layer on both sides of the film.

Representative samples of Pyranol dielectric impregnated polypropylene film subjected to electrical capacitor tests indicate a close correlation between the kind and degree of impregnation and corona start voltage, and essentially full and complete impregnation is an important feature of this invention. The combination of polypropylene and Pyranol dielectric liquid is favorable to a kind of impregnation, which in the present invention is defined as essentially complete impregnation. When the voids and interstices of the material are essentially filled with liquid impregnant and the impregnation process includes both adsorption of the impregnant liquid by the material itself as well as partial solution of the material in the liquid impregnant, the material is referred to as essentially or completely impregnated. Representative tests with specific resin systems with varying degrees of impregnation indicate very high and consistent CSV's, near the measured, computed, or ultimate CSV of the system, with systems where the impregnation process was extended or otherwise aided for essentially complete impregnation. An impregnation process which is an example of essentially complete impregnation involves submerging polypropylene film in Pyranol 1499 at a temperature of about 90° C. Under these conditions, relatively stable conditions are reached in about 6 to 20 days wherein about 1.0% by weight of polypropylene is dissolved in the Pyranol liquid and about 11% by weight of Pyranol liquid is taken up by the polypropylene. The kind and degree of impregnation may also be measured by the CSV of the system, values approaching a maximum indicating essentially complete impregnation.

The preferred polypropylene films used in the present invention generally comprise isotactic polypropylene. This is a high molecular weight stereo-regular crystalline material including, in addition to the crystalline phase which predominates, an amorphous or non-crystalline phase. In some commercially available isotactic polypropylenes, the amorphous phase may comprise as much as 30% of the total resin. Films of these resins may be formed, for purposes of the present invention, for example by rolling, extruding, pressing, solvent-casting, and melt casting. In order to improve the mechanical properties of resinous films, it is common to impart some form of ordered structure to such films by stretching and heat setting. Preferably stretching is done in mutually perpendicular directions, i.e., both longitudinally and transversely of the film length, so as to impart a biaxial orientation to the film. Films may also be uniaxially oriented, biaxially oriented, balanced biaxially oriented.

Polyolefin films, particularly polypropylene films, should have little if any residual contaminants present therein which might impart a high power factor, i.e., the measure of power dissipation in a given material, to the composite. Contaminants also may be external materials taken up from film processing operations or residual catalysts. These contaminants may be removed by appropriate solution of the polyolefin and removal of contaminates by precipitation extraction and adsorption methods. However, excellent results have been obtained with the use of commercially available polypropylene resins such as for example Profax 6520F Resin (Hercules Powder Co.) and Shell 5500F Resin (Shell Oil Co.)

Figure 2:
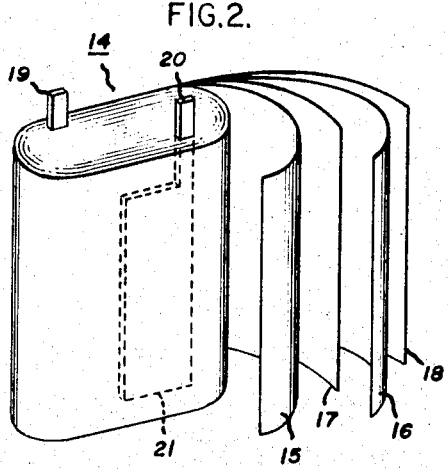
FIG. 2 is a perspective view of a partially uncoiled convolutely wound capacitor.
Figure 3:
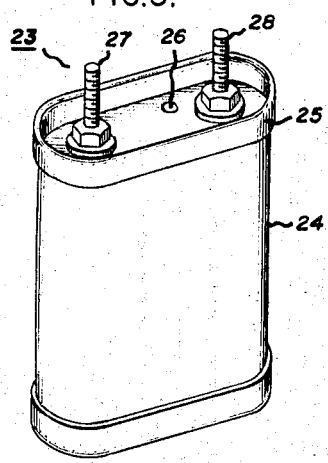
FIG. 3 shows a full assembled capacitor which includes a capacitor of the type shown in FIG. 2 and a container therefor.

Capacitor devices embodiyng the present invention, such as those illustrated in FIGS. 2 and 3, may have the same general configuration of presently known capacitors. Referring now to FIG. 2, there is shown a convolutely wound capacitor 14 comprising separate electrode foils or ---
[1] Trademark of the General Electric Company.

armatures 15 and 16, and intermediate dielectric spacers 17 and 18. Terminal connectors 19 and 20 have enlarged surfaces 21 and 22 (not shown) in contact with electrode foils 15 and 16. Electrode foils 15 and 16 may comprise one or more of a number of different materials, generally metallic, including for example aluminum, copper and tantalum. Dielectric spacers 17 and 18 generally comprise a composite or sandwich type structure which includes at least one impregnated resinous layer 11 in accordance with the present invention. More specifically, a dielectric spacer 17 and the metallic electrode foils 15 and 16, taken together, comprise a capacitor element structure.

Referring now to FIG. 3, there is shown an assembled capacitor unit 23 in which is encased a convolutely wound capacitor of the type shown in FIG. 2. The assembled unit also includes a container 24, a hermetically sealed cover 25, which includes a small dielectric liquid fill hole 26, and a pair of terminals 27 and 28, projecting through cover 25 and insulated therefrom. Within the container 24, terminals 27 and 28 are connected to terminal connectors 19 and 20, as shown in FIG. 2. Although not illustrated, the unit 23 shown in FIG. 3 further includes a dielectric liquid which occupies the remaining space in container 24 not occupied by the capacitor element, and which also impregnates the dielectric spacers 17 and 18 shown in FIG. 2.

In one general impregnation method, as described in the mentioned Clark and Ruscetta patents, capacitor units or encased assemblies such as capacitor 23, FIG. 3, of the present invention, are usually vacuum dried to remove residual moisture. The drying temperature will vary depending on the length of the drying cycle, but usually ranges from about 60° to 150° C. With too low a temperature the drying speed is excessively long while too high a temperature may cause decomposition of any paper component of the dielectric spacer. Hole 26 permits withdrawal of moisture from the interior of container or housing 24 during the drying process.

The impregnating dielectric liquid is admitted to the capacitor assembly through hole 26 preferably while the dried assembly is still under vacuum in a suitable evacuated enclosure. Usualy, enough of the impregnating liquid is introduced to at least submerge the capacitor element in the container. The pressure in the enclosure is then raised to atmospheric pressure and the assembly permitted to stand or soak for a number of hours for thorough penetration of the liquid impregnant. After impregnation, the capacitor unit may be sealed by applying a quantity of a suitable solder to hole 26. If the impregnant is a polymerizable resinous material, the capacitor assembly is thereafter subjected to an elevated temperature to effect polymerization and solidification of that material. In addition to the foregoing process, other techniques, which generally utilize heat and/or pressure, may be utilized in the practice of the present invention, for example, a number of methods including cycling of pressures, temperatures, or both may be employed to aid in the impregnation process. Heat and pressure may enhance impregnability by changing the relative wettability, viscosity and solubility of the materials. In addition, expansion and contraction of individual components of the system, which may be the result of heat and pressure, may act as a driving force to induce migration of liquid into the solid dielectric, particularly with hole 26 sealed.

Excellent results were obtained in this invention by including a heating cycle after impregnation or sealing to effectuate or ascertain higher degrees of impregnation or essentially complete impregnated dielectric systems, particularly capacitors. For example, wound and assembled capacitors are first impregnated by baking and evacuating the assembled capacitors and then filling them with or immersing them in a body of dielectric liquid impregnant which may be preheated or subsequently heated to enhance impregnation. Following this treatment, the assembled and impregnated capacitors are sealed and the sealed units are subjected to elevated temperature for an extended period of time.

A preferred heating cycle in the practice of this invention is defined as a controlled heating period utilizing elevated temperatures in the 65° to 95° C. range for a period of from about 4 to about 16 hours. Variations in processing, utilization of pressure, and additives may shorten the time period. A-C capacitors of high voltage utilizing a polypropylene film-paper composite dielectric spacer and a Pyranol 1499 dielectric liquid impregnant were heated in a temperature range of 85° to 95° C. from 4 to 16 hours and were found to have consistently high CSV.

The temperature conditions are controlled so that partial solution of the polyolefin takes place in the dielectric liquid and dielectric impregnant is dissolved in the resin to provide essentially complete impregnation. Increased permeation of a polypropylene film for example may be enhanced by the fact that some of the amorphous and/or low molecular weight portions of the polypropylene may dissolve in the liquid at about 85° to 95° C. More consistent and higher CSV characteristics have been noted when capacitors of this invention are subjected to the foregoing controlled temperature impregnation process.

Impregnation may also be further improved by modifying the physical characteristics of the components of the impregnated dielectric system. More specifically, mixtures of dielectric liquids, or additives, may be included in the dielectric liquid impregnant, or the solid dielectric material may be treated so as to effect the impregnability of the system. For example, Pyranol 1475 dielectric liquid, comprising primarily trichlorobenzene, may be added to Pyranol 1499 dielectric liquid in an amount for example 25 percent by weight. Other dielectric liquids which may be effectively employed in mixture with Pyranol for example are liquid mineral oil and silicone oil.

The impregnated dielectric systems of the present invention exhibit certain significant dielectric properties which render them highly advantageous for many electrical applications including insulated electrical devices generally, such as electrical cables and transformers, as well as capacitors. These properties are generally in three categories, i.e., increased dielectric strength, low energy loss in the dielectric, and high CSV by reason of impregation characteristics. Impregnation is most important because the kind and degree of impregnation controls the CSV attainable in the system. Increased dielectric strength is important because it provides a more efficient dielectric and also permits the use of a smaller volume or weight of dielectric material to withstand a given voltage in a system. Energy loss is important since energy loss in the system adversely affects the electrical efficiency of the unit and may cause physical deterioration of the structural materials of the unit due to the conversion of the dissipated energy into heat.

Most importantly, these significantly improved properties may be incorporated in A-C capacitors of high voltage stress capabilities by utilizing the dielectric of this invention. A-C capacitors have been assembled which are long-life operable at a voltage stress in excess of about 1200 volts per mil of impregnated dielectric and a CSV from about 750 volts to in excess of 3000 volts. Development of high voltage A-C capacitors has been previously limited because of the relatively short operating life of the dielectric under high voltage stress conditions. For example, previous A-C capacitors for long-life operation are operable in the general range of voltage stresses of less than about 500 volts and under short life pulse conditions may reach only about 750 volts.

Figure 4:
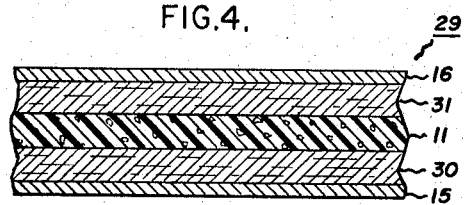
FIG. 4 is an elevational cross sectional view of one portion of an electrical capacitor having an impregnated resinous film as a component of the dielectric spacer and denoted as a full sandwich structure.

Other examples of capacitor elements incorporating the improved dielectric of this invention are illustrated in FIGS. 4 through 8. In FIG. 4 there is shown a portion 29 of a capacitor in which one type of composite dielectric spacer, termed the full sandwich, is used. This capacitor portion comprises an impregnated resinous dielectric film 11, interposed between a pair of impregnated porous dielectric sheets 30 and 31, and a pair of electrode foils 15 and 16. Sheets 30 and 31 may be a well known paper such as kraft paper and also may be suitably impregnated with a liquid dielectric, for example the dielectric liquid of this invention. The term "porosity" as applied to this paper indicates a substantial number of continuous passages or pores in and through the paper which are capable of passing the liquid impregnant through the paper from one side surface through the opposite side surface. The CSV characteristics of an impregnated resinous film are in large part dependent on the effective impregnation of the film interstices as well as between the surfaces of that film and any adjacent material. The CSV of a full sandwich dielectric, such as that shown in FIG. 4, is increased by the use of an adjacent surface such as paper.

Figure 5:
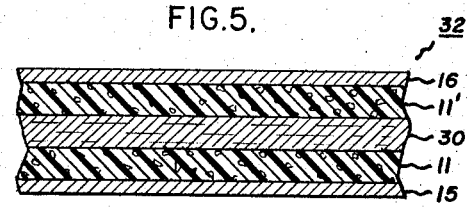
FIG. 5 is an elevational cross sectional view of a portion of another electrical capacitor having multiple impregnated resinous films as components of the dielectric spacer and denoted as an inverted sandwich.

In FIG. 5 there is shown an embodiment 32 which utilizes another composite dielectric spacer structure. This has been termed the inverted sandwich. This composite dielectric spacer comprises a single sheet of impregnated porous material 30 or 31, interposed between a pair of impregnated resinous films 11 and 11'. The composite dielectric spacer is itself interposed between a pair of electrode foils 15 and 16. Exemplary capacitors of this type included a single sheet of 0.66 mil kraft paper for the porous material between two sheets of 0.50 mil polypropylene. This ordinarily difficult to impregnate system was impregnated without difficult to yield a capacitor unit of 0.9 mf. and a CSV of greater than 2650 v. A-C root mean square.

The unique combination of polypropylene and Pyranol 1499 provides ease of impregnation even in a tightly wound roll where formerly other prior art combinations were required to rely on loosely wound rolls for fuller impregnation. An important advantage of the polypropylene-Pyranol combination in this as well as other structures is that the polypropylene passes the impregnant therethrough to reach heretofore difficult to reach voids and interstices in remote areas from the origin of impregnation, and particularly those along and near the foil or electrode to film interface.

Figure 6:
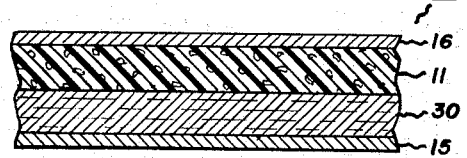
FIG. 6 is an elevational cross sectional view of a portion of still another electrical capacitor which includes a relatively thick impregnated resinous film in its dielectric spacer and denoted as a semi-sandwich structure.

A capacitor dielectric spacer structure 33 similar to that shown in FIG. 5 is shown in FIG. 6. This structure 33, denominated the semi-sandwich, differs from the inverted sandwich by the omission of one of the impregnated resinous films 11 or 11' therefrom.

Figure 7:
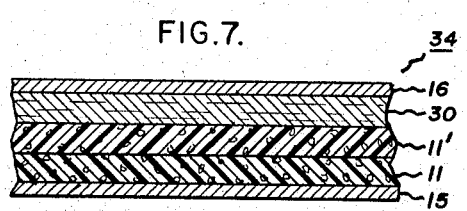
FIG. 7 is an elevational cross sectional view of a portion of a modified semi-sandwich capacitor having multiple adjacent impregnated resinous films as components of the dielectric spacer.

Another modification of the present invention, as shown in a capacitor structure, is seen in FIG. 7. This embodiment, which utilizes a composite dielectric spacer 34 referred to herein as a modified semi-sandwich, comprises two contiguous impregnated resinous films 11 and 11' and an impregnated porous sheet 30 adjacent thereto. As in the other embodiments, this composite dielectric spacer is interposed between a pair of electrode foils 15 and 16. The purpose of placing the resinous films 11 and 11' adjacent one another is to prevent dielectric failure due to an imperfection in a single thickness of resinous film. Adjacent resinous films tend to block any imperfection in one of the films and thereby prevent failures. FIG. 7 represents a much improved capacitor element in which a pair of adjacent films provides impregnation characteristics more favorable in many respects than a single film of equivalent thickness.

Figure 8:
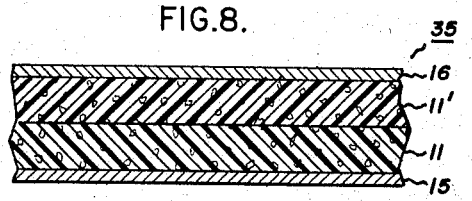
FIG. 8 is an expanded cross sectional view of a portion of an electrical capacitor in which the dielectric spacer comprises only impregnated resinous films.

In FIG. 8 there is shown an electrical capacitor structure 34 having two adjacent impregnated resinous films 11 and 11', as the dielectric spacer, interposed between a pair of electrode foils 15 and 16. Two adjacent thin films 11 and 11' are used, rather than one film twice as thick, for the same reason pointed out with respect to the embodiment shown in FIG. 7. Another important feature of the embodiment shown in FIG. 8 is the absence of any porous sheet such as 30 or 31 (FIG. 4) to act as a wick or impregnation-facilitating layer.

It will be appreciated that in each of the embodiments shown in FIGS. 4-8, many minor modificatioins may be made. For example, metallized films on the outer surfaces of the composite dielectric spacers may be used to serve as electrodes in lieu of the electrode foils 15 and 16 illustrated. Similarly, the resinous films in each of the above embodiments may comprise either self-supporting films or supported films formed, as a coating or layer, on another element of the capacitor structure, such as an electrode foil or porous dielectric sheet.

In the structures shown in FIGS. 5 through 8, at least one surface of the resinous film is adjacent a relatively non-porous surface, such as an electrode foil or another resinous film. It is very important to sufficiently or completely impregnate a resinous surface, but difficult to do so when the resinous film surface is adjacent a relatively non-porous surface. However, by means of the present invention such difficulty is minimized. Consequently, those structures, such as those shown in FIGS. 4-8, having relatively high CSV's, are provided (for the first time) in this present invention.

To illustrate these improved properties in the dielectric systems of the present invention, a considerable number of capacitor elements as illustrated in FIGS. 1-8 were assembled and subjected to standard electrical capacitor tests and service life conditions and measurements comparisons have been made.

Synthetic resin materials are known to have extremely high intrinsic (small area) dielectric strength. For example, as used in the present invention the impregnated polypropylene film has operable dielectric strength of over 1200 volts per mil, although its intrinsic dielectric strength may be over 20,000 volts per mil, based on an area of about 0.01 square inch. Impregnated paper, the most common dielectric material presently in use in A-C capacitors, has an operable dielectric strength of about 400 volts per mil. The extent to which utilization of the higher dielectric strength resinous dielectrics of this invention reduces the quantity of dielectric material required in various types of a given system may be illustrated by comparing test results of several similarly impregnated dielectric spacers for electrical capacitors. These types, which include all-paper, i.e., only paper sheets between electrodes, paper-polypropylene film composites, and all film, i.e., only polypropylene film between electrodes, are listed in Tables I and II.

TABLE I

| Description | Composition | Total Thickness (mils) | Resin Fraction (percent of total space thickness) | Operating Voltage Stress (v./mil) |
| --- | --- | --- | --- | --- |
| All paper | Three 0.3 mil paper | 0.9 | 0 | 400 |
| Full sandwich | 0.3 mil polypropylene film between two 0.3 mil paper sheets. | 0.9 | 33 | 670 |
| Semi-sandwich | 0.45 paper+0.45 polypropylene film. | 0.9 | 50 | 800 |
| Inverted sandwich | 0.3 mil paper between two 0.3 mil polypropylene films. | 0.9 | 67 | 930 |
| All film | 0.9 mil polypropylene film or two 0.45 mil polypropylene film. | 0.9 | 100 | 1,200 |

In Table I, a standard total dielectric thickness of about 0.9 mil is used since some of the composite spacers require three thicknesses total of either film or paper and the minimum practical thickness for both film and paper is about 0.3 mil. The voltage which each of these combinations may be expected to operate with long service life, as listed in Table I, illustrates the advantages of using a polyolefin film either as a supplement or as a substitute for the paper dielectric spacers heretofore used. These values may be influenced in various systems by the degree and kind of impregnation and by the uniformity of dielectric properties in the system. These values include an accepted approximation of the ratio of dielectric constants of impregnated paper and impregnated polypropylene. Specifically, a ratio of 3:1 was used. It should be noted that the distribution of voltage in the system resulting from this ratio of dielectric constants results in a stress on the film components of about 1200 volts per mil, which is an operable dielectric strength of polypropylene, providing long service life.

Comparing a 150 k.v.a.r. capacitor with a Pyranol-polypropylene-paper dielectric to a 100 k.v.a.r. capacitor with a Pyranol-paper dielectric, the former is smaller and weighs 0.7 pound per k.v.a.r. The latter, which represents a typical prior art capacitor, weighs 1.29 pounds per k.v.a.r.

Although the overall weight and volume of electrical capacitors having any given rating may be reduced by means of the present invention, it should be noted also that in some instances there may be a maximum practical size for an electrical capacitor and the present invention may also be used to produce capacitors of this size having a higher rating. In all of the above cases, the improved weight and volumetric efficiency of the units can be attributed to the use of a combination of materials which results in a stress level in the resinous component approaching the maximum practical stress bearing capability of that component.

There are many applications, such as those utilizing high voltage power capacitors, in which it is highly de-

TABLE II

| Description | Composition | Total Thickness (mils) | Voltage Capability of the System | Volumetric Efficiency $\mu f.$ ($\mu f./in.^3$) | Operating Voltage Stress (v./mil) |
|---|---|---|---|---|---|
| All paper | Three 1.0 mil | 3.0 | 1,200 | .14 | 400 |
| Full sandwich | 0.6 mil film between two 0.6 mil paper sheets. | 1.8 | 1,200 | .22 | 670 |
| Semi-sandwich | 0.75 mil film+0.75 mil paper sheet. | 1.5 | 1,200 | .26 | 800 |
| Inverted sandwich | 0.43 mil paper sheet between two 0.43 mil films. | 1.29 | 1,200 | .29 | 930 |
| All film | One 1.0 mil film | 1.0 | 1,200 | .36 | 1,200 |

In Table II, the same types of dielectric spacers are listed along with the thicknesses thereof required to withstand a total voltage on the system of 1200 volts. For purposes of this computation, the thicknesses of each film and paper sheet were considered to be the same in any given composite type. A still more efficient arrangement for a number of applications would include a minimum thickness of paper, and to compensate for this minimum thickness slightly thicker films are used. The data in Table II are indicative of the reduced amount of dielectric material required to withstand a given voltage as the proportion of resinous material in the dielectric is increased. Table II also indicates the volumetric efficiency to be expected in capacitors having dielectric spacers of the types listed. These values are given in microfarad per cubic inch of dielectric spacer.

Both 50 and 150 k.v.a.r. (kilovolt ampere reactive) units, embodying the present invention, have been built and operated for long periods of time, including thousands of hours of service life testing. These units are designed for and operated at voltage stress levels which result in a stress on the resinous component of the dielectric system approaching 1200 volts per mil. The size and weight of these units demonstrate that the potential improvements illustrated by Tables I and II have been realized.

For example a 50 k.v.a.r. capacitor having an inverted sandwich polypropylene-paper dielectric impregnated with Pyranol 1499 dielectric liquid having an epoxy compound stabilizer occupies 40% less volume than the prior art all-paper design or, in other words, is a little over one-half as large. If the 50 k.v.a.r. capacitor of this invention were as large as a prior art 50 k.v.a.r. capacitor, the capacitor of this invention would have a markedly higher capacity rating. By comparison, an all-paper unit of approximately the same size as the 50 k.v.a.r. film composite capacitor has a rating of approximately 30 k.v.a.r. Corresponding significant weight reduction is also achieved.

sirable to reduce energy dissipation in the dielectric system to the greatest extent possible. The impregnated resinous dielectric systems of the present invention are particularly advantageous in these applications. The power factor of the systems of this invention is generally between about 0.05 and about 0.15% at rated voltage, even at substantially above room temperature. This represents a significant improvement over typical impregnated prior art systems with power factors from 0.2 to above 0.5%, and further permits a reduction of as much as 40% in size over the mentioned typical capacitor in larger sizes.

As an example of the reduced energy dissipation in the impregnated resinous dielectric systems of the present invention, a test was conducted on a 50 k.v.a.r. capacitor with a Pyranol 1499-impregnated inverted sandwich polypropylene spacer. This capacitor, as pointed out above, is 40% smaller than its all-paper 50 k.v.a.r. counterpart. The amount of energy dissipated in this capacitor was indicated by the dielectric temperature rise, i.e., the amount of temperature rise measured in the dielectric of the capacitor over ambient temperature. In this test a 25° C. dielectric temperature rise was measured in the film capacitor as compared to a 48° C. temperature rise in a comparison all-paper unit. In addition, after a 5000-hour life test at 55° to 70° C., the dissipation factor of the inverted sandwich unit was about 0.05% as compared to about 0.2% for the all-paper unit.

As an example of the stability of power or dissipation factor in a Pyranol 1499-polypropylene dielectric system, a test was conducted on a group of electrical capacitors having semi-sandwich dielectric spacers comprising adjacent sheets of 0.5 mil polypropylene and 0.4 mil kraft paper, impregnated with Pyranol 1499 dielectric liquid including about 1% by weight 1-epoxyethyl-3,4-epoxycyclohexane. These capacitors were temperature cycle tested and aged and the following measurements of dissipation factor were made at the rated voltage of the capacitors, 460 volts A-C, 60 cycles per second:

TABLE III

| Time (hours) | Percent Dissipation Factor | | |
|---|---|---|---|
| | 25° C. | 65° C. | 85° C. |
| 0 | 0.143 | 0.113 | 0.119 |
| 519 | 0.120 | 0.091 | 0.096 |
| 1,524 | 0.119 | 0.094 | 0.093 |
| 5,008 | 0.113 | 0.084 | 0.090 |

These results indicate the highly stabilized nature of the dissipation factor in the system through a temperature range from 25° to 85° C., and through more than 5000 hours of use.

Since impregnation is important to prevent the formation of corona discharge in a solid dielectric, the impregnation characteristics of the dielectric systems of the present invention is an important consideration. In some applications, such as those utilizing high voltage power capacitors, CSV's well above 2000 volts are required. Although many physical characteristics of both the resinous material and the dielectric liquid impregnant may be involved in determining the impregnability of the overall system, permeability of the resin to the liquid is related to the solubility of the resin in the liquid. This relationship has been demonstrated by a test in which a quantity of Pyranol 1499 dielectric liquid impregnant was contained in a bag or envelope made of a non-porous polypropylene resinous film as employed in this invention, with the envelope placed in an oven at about 75° C. Permeation, through the bottom portion of the envelope, was observed by passing the bottom of the envelope contiguously across a microscopic slide. When the dielectric liquid had permeated the envelope, a smear was produced upon the microscopic slide. Using this test, it has been demonstrated that polypropylene film is not permeated by Pyranol 1499 dielectric liquid, after many hours, at room temperature. Permeation can be observed after only a few hours, however, when the temperature of the system is raised to 75° C. and above.

When temperature impregnation is combined with a pressure application, such as an external pressure application, or an internal pressure application by heating essentially complete impregnation, as evidenced by CSV's consistently about 2500 volts, is attained for more difficult to impregnate units. For example, in a large tightly wound capacitor with the dielectric system adjacent a non-porous material, such as an electrode metal foil, the confines of the system permit only limited accessibility of the liquid dielectric to the dielectric system and it is for this reason, pressure in addition to temperature, is desirable to produce optimum impregnation. It is significant that both in the bag permeation test and in the capacitor impregnation test, with Pyranol 1499 dielectric liquid, the effect of the dielectric liquid on the dielectric film is substatnially different at room temperature than it is at temperatures in the range from 75° to 85° C.

To demonstrate the consistently high CSV's which may be produced in the capacitors of the present invention, three 40 k.v.a.r. convolutely wound inverted film sandwich capacitors, each comprising a sheet of 0.3 mil paper interposed between two sheets of 0.5 mil polypropylene, were impregnated with Pyranol 1499 dielectric liquid, which included a small amount of an epoxy-type stabilizer. These capacitors were 10.5 inches wide and had an initial CSV of 750 to 1050 v. A-C. The units were heated to 100° C. for several hours and essentially complete impregnation was attained, indicated by CSV's above 3000 volts. After testing other electrical characteristics of the capacitors, CSV was rechecked. The results of this test are summarized in Table IV.

TABLE IV

| Sample No. | CSV after— | | |
|---|---|---|---|
| | Initial CSV | Heat Soaking | Recheck CSV |
| 1 | 1,050 | >3,100 | >3,100 |
| 2 | 750 | >3,050 | >3,100 |
| 3 | 950 | >3,100 | >3,100 |

The extremely high CSV in these capacitors, along with the consistency with which it has been attained, is taken to be an indication that essentially complete impregnation has been attained. Another indication that essentially complete impregnation has been attained is that the measured values of CSV approach the ultimate that would be expected based on mathematical computations.

Pyranol 1499-impregnated polypropylene-paper dielectrics are significantly more resistant to corona damage than are conventional impregnated paper dielectrics. Specifically, test capacitors, such as the kind illustrated in FIG. 5, subjected to a 300% overvoltage (i.e., three times their rated voltage capacity) for 30 seconds were found to have relatively little corona damage and actually improved power factors. These test capacitors included a Pyranol 1499-impregnated polypropylene-paper dielectric. Conventional prior art paper and other paper resin capacitors, by comparison, tested in the same way exhibited a substantial increase in power factor and a significant amount of corona damage. Corona damage was assessed in both cases by disassembly and visual inspection of the dielectrics.

In addition to the solid dielectric materials and the dielectric liquid with which they are impregnated, the systems of the present invention may also include numerous other components. In particular, it is often desirable to include a component to act as a stabilizer in the impregnated dielectric system. Generally, the purpose of having a stabilizer in the system is to neutralize certain contaminants or extraneous materials which may be present or which may be formed in the system. Such contaminants may include residual catalyst, or catalyst activators or neutralizers, which remain from the resin-forming reaction. Another source of such contaminants may include degradation products caused by environmental or voltage-induced chemical reaction in the system. These undesirable contaminants and extraneous products have an adverse effect on the dissipation or power factor of the impregnated dielectric system. Stabilizing agents have been found to be highly effective in stabilizing the power factor of an impregnated resin dielectric system.

Examples of stabilizing agents are dipentene dioxide, and 1-epoxyethyl-3, 4-epoxycyclohexane, which are more fully disclosed and claimed in U.S. Patents 3,242,401, Katchman, and 3,342,402, Stahr et al., assigned to the same assignee as the present invention. More particularly, 1-epoxyethyl-3, 4-epoxycyclohexane has been employed in this invention in dielectric liquids in amounts in the general range of 0.001% by weight to about 8.0% by weight. A preferred range is about 0.35% by weight to 1.0% by weight, using polypropylene film and a Pyranol liquid impregnant.

Particulate inorganic material, such as alumina, may also be used as a stabilizing agent. The effectiveness of this material to correct long-term power factor deterioration and to improve capacitor life, as well as to improve impregnability, is more fully described and claimed in my copending application S.N. 559,030 filed May 24, 1966, now U.S. Patent 3,340,446 also assigned to the same assignee as the present invention.

Another component which is often used in the impregnated dielectric systems of the present invention is a porous dielectric material sheet which is positioned adjacent a resin film sheet to function as a wick, through capillary action, to pass the dielectric liquid impregnant into the area coextensive with the area of contact between the porous dielectric material sheet and the solid resinous dielectric material sheet. In a resinous film dielectric, having a large amount of surface area, at least one such impregnation-facilitating porous layer is advantageous. This is particularly effective, for example, in relatively large, tightly wound capacitors in which essentially complete impregnation, or extremely high CSV, is required.

The porous material used is preferably kraft capacitor paper having a thickness not greater than about 1.0 mil and preferably about 0.3 mil. Such paper has a dielectric strength which is relatively good as compared to other dielectrics, although substantially less than that of most solid resinous materials. In addition, it has a relatively high dielectric constant which enhances the distribution of voltage in a composite system such that a greater proportion of the voltage is placed on the higher dielectric strength resinous material. Synthetic resin or glass fiber paper may also be utilized as the wick element in this invention.

The effectiveness of modifying the physical characteristics of the dielectric liquid impregnant, in order to improve impregnation and the resultant kind and degree of impregnation, has been demonstrated by tests in which capacitors having all-film dielectric spacers comprising two sheets of 0.28 mil polypropylene, have been impregnated with epoxy-modified Pyranol 1499. Similar capacitors were impregnated with a mixture of the same impregnant with another dielectric liquid, Pyranol 1478, in a ratio of about 3 parts of Pyranol 1499 to 1 of the Pyranol 1478. The latter impregnant is a commercially available dielectric liquid composed primarily of trichlorobenzene. While the capacitors impregnated with Pyranol 1499 had CSV's in the range from 400 to 1000 volts A-C, the capacitors having the mixed dielectric liquid impregnant exhibited CSV's above 1500 volts A-C, indicating a substantially improved degree of impregnation.

While an exemplary description of this invention has utilized polypropylene as a polyolefin example, the invention may also be practiced effectively with other members of the polyolefin family of materials, particularly polyethylene and 4-methyl pentene-1. Representative tests indicate that these materials also may be impregnated with a dielectric liquid medium in the same manner as polypropylene, however with different results. For example, high density polyethylene film was impregnated with Pyranol liquid dielectric by a process similar to that described with respect to polypropylene. Impregnation at temperatures in the range of about 85° C. to 100° C. for about 16 hours was found to markedly increase the CSV of the composite.

Representative examples of impregnation with other dielectric liquids notably those previously in mixtures with Pyranol liquid, i.e., mineral oil, silicone oil, and other Pyranol liquids indicate that those liquids may be the total or major part of the impregnant. Other oils which may be utilized for more limited applications include cottonseed oil.

Other combinations may include for more specialized applications impregnated crosslinked polyethylene, or paper materials impregnated with the polyolefin of this invention, for example a paper impregnated with a melt or solution containing polypropylene with the resultant material impregnated with a Pyranol dielectric.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. An electrical capacitor assembly comprising
   (a) a housing;
   (b) a capacitor element in said housing, said capacitor element comprising
      (1) at least a pair of electrodes,
      (2) a polyolefin film dielectric spacer between said electrodes,
   (c) a dielectric liquid in said housing and essentially completely impregnating said polyolefin;
   (d) said dielectric liquid comprising a halogenated aromatic compound having from 1 to 5 chlorine substituents and from 1 to 3 aryl groups.

2. The invention as recited in claim 1 wherein said polyolefin is polyethylene.

3. The invention as recited in claim 1 wherein said polyolefin is 4-methyl pentene-1.

4. An electrical capacitor assembly as recited in claim 1 wherein said film is a polypropylene film.

5. An electrical A-C capacitor assembly as recited in claim 1 wherein said film is a biaxially oriented polypropylene film.

6. An A-C electrical capacitor assembly as recited in claim 1 wherein said dielectric liquid comprises trichlorodiphenyl.

7. An A-C electrical capacitor assembly as recited in claim 1 wherein said film is a biaxially oriented polypropylene film and said dielectric liquid comprises trichlorodiphenyl.

8. The invention as recited in claim 7 wherein said dielectric liquid comprises a mixture of trichlorodiphenyl and trichlorobenzene.

9. An electrical capacitor assembly as recited in claim 1 wherein said film is polypropylene and said dielectric liquid comprises trichlorodiphenyl and a stabilizer additive.

10. An electrical capacitor assembly as recited in claim 9 wherein said stabilizer additive is an epoxide selected from the group consisting of dipentene dioxide and 1-epoxyethyl-3,4-epoxycyclohexane.

11. An electrical capacitor assembly as recited in claim 6 wherein said spacer comprises a polypropylene film between a pair of sheets of a porous dielectric material.

12. An electrical capacitor assembly as recited in claim 6 wherein said dielectric spacer comprises a sheet of porous dielectric material interposed between polyolefin films at least one of which is polypropylene.

13. An electrical capacitor assembly as recited in claim 6 wherein said spacer comprises a polypropylene film and at least one sheet of a porous dielectric material adjacent thereto, and said film has one surface thereof adjacent a surface other than a surface of a porous dielectric.

14. An electrical capacitor assembly as recited in claim 6 wherein said dielectric spacer comprises two contiguous polyolefin films, at least one of which is polypropylene and one of said films having one surface thereof adjacent a porous dielectric material.

15. An electrical capacitor assembly as recited in claim 6 wherein said spacer consists essentially of a pair of contiguous polyolefin films between electrodes, at least one of which is polypropylene.

16. The invention as recited in claim 1 wherein said capacitor is an AC capacitor characterized in that said film is sufficiently thin to provide a working AC stress of more than about 750 volts per mil thickness at its predetermined application voltage.

17. An electrical capacitor assembly comprising
   (a) a housing;
   (b) a capacitor element in said housing comprising
      (1) at least a pair of electrodes,
      (2) a biaxially oriented polypropylene film dielectric spacer between said electrodes, (3) a paper sheet between said electrodes,
(4) said paper, film, and electrodes being in rolled form,
(c) electrical terminal means on said housing and in contact with the said electrodes of said capacitor element;
(d) a dielectric liquid in said housing and essentially completely impregnating said film and paper;
(e) said dielectric liquid being trichlorodiphenyl with an epoxide additive therein.

References Cited

UNITED STATES PATENTS 3,016,481  1/1962  Simpson _____ 317—258

OTHER REFERENCES

Birks, Modern Dielectric Materials, London, Heywood & Co., 1960, pp. 140–143.

LEWIS H. MYERS, *Primary Examiner.*

E. GOLDBERG, *Assistant Examiner.*

UNITED STATES PATENT OFFICE
CERTIFICATE OF CORRECTION

Patent No. 3,363,156

January 9, 1968

Eugene B. Cox

It is hereby certified that error appears in the above numbered patent requiring correction and that the said Letters Patent should read as corrected below.

Column 2, line 41, for "ride" read -- side --; column 3, line 32, for "Bink" read -- Birk --; line 52, for "pyranol" read -- Pyranol --; column 7, line 30, for "difficult" read -- difficulty --; column 11, line 59, for "substatnially" read -- substantially --; column 12, TABLE IV, heading to columns 2, 3 and 4, strike out "CSV after-"; same TABLE, third column heading, for "Heat Soaking" read -- CSV after-Heat Soaking --; column 13, line 11, for "kraft" read -- Kraft --.

Signed and sealed this 15th day of April 1969.

(SEAL)
Attest:

Edward M. Fletcher, Jr.
Attesting Officer

EDWARD J. BRENNER
Commissioner of Patents